(12) United States Patent
O'Dea et al.

(10) Patent No.: US 11,713,036 B2
(45) Date of Patent: Aug. 1, 2023

(54) SYSTEM AND METHOD FOR MAINTAINING STABILITY OF A MOTOR VEHICLE

(71) Applicant: GM GLOBAL TECHNOLOGY OPERATIONS LLC, Detroit, MI (US)

(72) Inventors: Kevin A. O'Dea, Ann Arbor, MI (US); Jacob R. Kilver, Almont, MI (US); Avshalom Suissa, Ganei Tikva (IL)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 17/511,611

(22) Filed: Oct. 27, 2021

(65) Prior Publication Data
US 2023/0126666 A1    Apr. 27, 2023

(51) Int. Cl.
*B60W 30/02* (2012.01)
*B62D 5/04* (2006.01)
(Continued)

(52) U.S. Cl.
CPC .......... *B60W 30/02* (2013.01); *B60W 40/101* (2013.01); *B60W 50/0097* (2013.01); *B60W 50/06* (2013.01); *B62D 5/0457* (2013.01); *B62D 15/021* (2013.01); *B60W 2510/20* (2013.01); *B60W 2520/10* (2013.01); *B60W 2520/12* (2013.01); *B60W 2520/14* (2013.01); *B60W 2556/60* (2020.02)

(58) Field of Classification Search
CPC ............... B60W 30/02; B60W 40/101; B60W 50/0097; B60W 50/06; B60W 2510/20; B60W 2520/10; B60W 2520/12; B60W 2520/14; B60W 2556/60; B62D 5/0457; B62D 15/021
See application file for complete search history.

(56) References Cited

U.S. PATENT DOCUMENTS 6,449,542 B1 * 9/2002 Bottiger ................. B62D 6/003
701/72
11,597,379 B2 * 3/2023 Yoon .................... B60W 40/114
(Continued)

FOREIGN PATENT DOCUMENTS

CN    111731265 A  * 10/2020    .......... B60W 30/025

*Primary Examiner* — Sze-Hon Kong
(74) *Attorney, Agent, or Firm* — Quinn IP Law (57) ABSTRACT

A method of maintaining stability of a motor vehicle having a first axle, a second axle, and a steering actuator configured to steer the first axle includes determining localization and heading of the vehicle. The method also includes determining a current side-slip angle of the second axle and setting a maximum side-slip angle of the second axle using the friction coefficient at the vehicle and road surface interface. The method additionally includes predicting when the maximum side-slip angle would be exceeded using the localization, heading, and determined current side-slip angle as inputs to a linear computational model. The method also includes updating the model using the prediction of when the maximum side-slip angle would be exceeded to determine impending instability of the vehicle. Furthermore, the method includes correcting for the impending instability using the updated model and the maximum side-slip angle via modifying a steering angle of the first axle.

20 Claims, 3 Drawing Sheets

(51) Int. Cl.
  *B62D 15/02*     (2006.01)
  *B60W 50/06*     (2006.01)
  *B60W 40/101*    (2012.01)
  *B60W 50/00*     (2006.01)

(56) References Cited

U.S. PATENT DOCUMENTS

2020/0198397 A1* 6/2020 Wilson .............. B60B 35/1063
2021/0206379 A1* 7/2021 Bobier-Tiu ............ G06T 17/10
2022/0250612 A1* 8/2022 Wang .................... G01S 13/723
2023/0001935 A1* 1/2023 Hrvatinic .......... B60W 50/0098

* cited by examiner

SYSTEM AND METHOD FOR MAINTAINING STABILITY OF A MOTOR VEHICLE

INTRODUCTION

The present disclosure relates to a system and a method for maintaining stability of a motor vehicle.

Autonomous vehicles include sensors operable to detect vehicle operation and the environment surrounding the vehicle, and a computing device operable to control all aspects of vehicle operation. Semi-autonomous vehicles operate in a similar manner, but may require some operator input, oversight, and/or control. Autonomous and semi-autonomous vehicles generally employ a vehicle navigation system integrated with vehicle controls to identify position of the vehicle and determine the vehicle's direction to a selected waypoint.

Typically, a vehicle navigation system uses a global positioning system (GPS) satellite to obtain its position data, which is then correlated to the vehicle's position relative to a surrounding geographical area. Based on the GPS satellite signal, when directions to a specific waypoint are needed, routing to such a destination may be calculated, thereby determining a vehicle path. Specifically, the vehicle sensors and the computing device may cooperate to identify intermediate way points and maneuver the vehicle between such way points to maintain the vehicle on the selected path.

Maneuvering of a motor vehicle, especially at higher speeds, is dependent on vehicle traction, which is generally a function of the friction coefficient at an interface between the vehicle and the road surface. Similar to operator-guided vehicles, while following a predetermined path, autonomous and semi-autonomous vehicles may experience traction loss at one or more road wheels, adversely affecting stability and control of the vehicle. While, in the case of operator-guided vehicles, driving demands of the vehicle operator may play a role in such a traction loss, in the case of autonomous and semi-autonomous vehicles traction loss is primarily the result of road conditions.

SUMMARY

A method of maintaining stability of a motor vehicle having a first axle, a second axle, and a steering actuator configured to steer the first axle via a steering angle ($\theta$) includes determining, via an electronic controller, localization and heading of the motor vehicle relative to a road surface. The method also includes determining a current side-slip angle ($\alpha$) of the second axle. The method additionally includes setting, via the electronic controller, a maximum side-slip angle ($\alpha_{max}$) of the second axle using a friction coefficient ($\mu$) value at an interface between the motor vehicle and the road surface. The method also includes predicting, via the electronic controller, when the maximum side-slip angle ($\alpha_{max}$) of the second axle is to be, or would be, exceeded using the localization and heading of the motor vehicle and the determined current side-slip angle ($\alpha$) of the second axle as inputs to a linear computational model. The method additionally includes updating, via the electronic controller, the linear computational model using the prediction of when the maximum side-slip angle ($\alpha_{max}$) of the second axle is to be exceeded to determine impending instability of the motor vehicle. Furthermore, the method includes correcting, via the electronic controller, for the impending instability using the updated linear computational model and the maximum side-slip angle ($\alpha_{max}$) of the second axle via commanding the steering actuator to modify the steering angle ($\theta$).

The motor vehicle may be configured to operate in an autonomous mode guided by the electronic controller. Determination of the localization and the heading of the motor vehicle may include determining, via the electronic controller, a desired path and discrete waypoints for the motor vehicle via receiving data from a global positioning satellite (GPS) and data from vehicle sensors such as radar and lidar.

With respect to the vehicle heading, the first axle may be a leading axle, the second axle may be a trailing axle. In such an embodiment, instability of the motor vehicle may be an oversteer condition culminating in a spin.

According to the method, determining the current side-slip angle ($\alpha$) of the second axle may include receiving, via the electronic controller, data indicative of a dynamic state of the motor vehicle from sensors mounted to the vehicle, including a yaw rate sensor to detect a yaw rate ($\psi$) of the motor vehicle, and at least one of wheel sensors, the GPS, and accelerometer(s) to detect longitudinal velocity ($V_x$) and lateral velocity ($V_y$) of the motor vehicle.

The linear computational model may be embedded in a Model Predictive control (MPC) algorithm. According to the method, the MPC algorithm may be configured to determine the impending instability of the motor vehicle by repeatedly solving an open-loop finite-horizon optimal control equation employing constraints on the steering actuator, such as steering rate and angle limits, variable with vehicle speed, and the maximum side-slip angle ($\alpha_{max}$) of the second axle.

According to the method, detecting the steering angle ($\theta$) of the steering actuator may be accomplished via a steering position sensor.

The steering actuator may be configured as an electrical power steering unit.

The maximum side-slip angle ($\alpha_{max}$) may be determined according to relationship $\alpha_{max}=\mu*\alpha$. In such an embodiment, $\mu$ is the friction coefficient at the interface between the motor vehicle and the road surface.

According to the method, if $\mu<0.3$, the maximum side-slip angle ($\alpha_{max}$) may be in a range of 1-2 degrees. Additionally, if $\mu>0.3$, the maximum side-slip angle ($\alpha_{max}$) may be in a range of 3-4 degrees.

According to the method, if $\mu$ is unknown, the maximum side-slip angle ($\alpha_{max}$) may be set to 1 degree.

A motor vehicle having an electronic controller configured to execute the above method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above," "below," "upward," "downward," "top," "bottom,", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
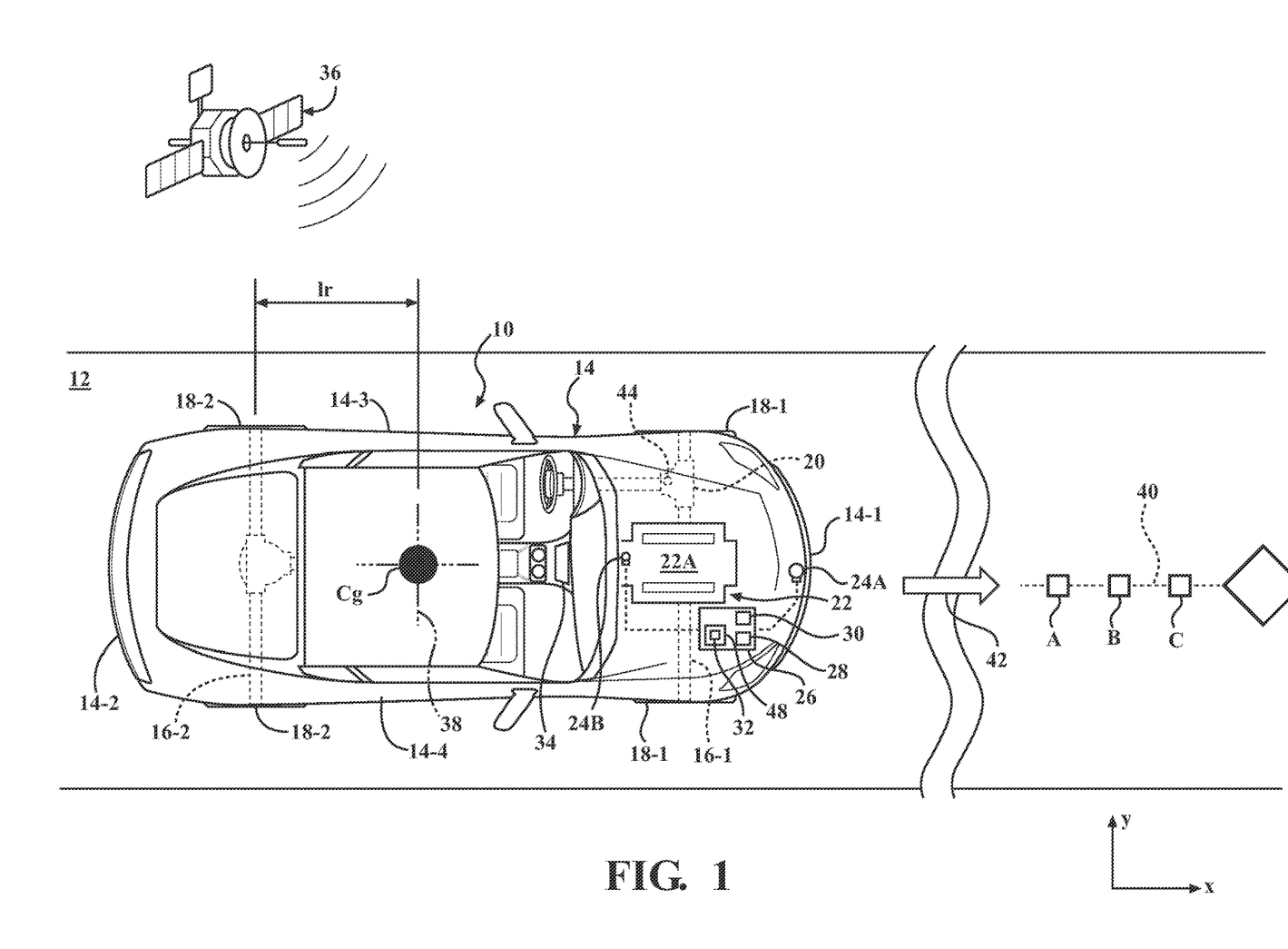
FIG. 1 is a schematic plan view of a motor vehicle having first and second axles traversing a geographical area; the vehicle employing a global positioning satellite (GPS) and vehicle sensors in communication with an electronic controller configured to maintain vehicle stability as the vehicle traverses a selected path.

Referring to the FIGS., wherein like numerals indicate like parts referring to the drawings, wherein like reference numbers refer to like components, FIG. 1 shows a schematic view of a motor vehicle 10 positioned relative to a road surface 12. The vehicle 10 may include a type of moveable platform, such as but not limited to a car, truck, van, etc. As shown in FIG. 1, the vehicle 10 includes a vehicle body 14 defining four body sides—a first body end or front end 14-1, an opposing second body end or rear end 14-2, a first lateral or left body side 14-3, and a second lateral or right body side 14-4. Although not specifically shown, vehicle body 14 may also define a top body portion, which may include a vehicle roof, an underbody portion, and a passenger compartment. The left body side 14-3 and right body side 14-4 are disposed generally parallel to each other and with respect to a virtual longitudinal vehicle body axis X of the motor vehicle 10, and span the distance between the front end 14-1 and the rear end 14-2.

The motor vehicle 10 also includes a first axle 16-1 and a second axle 16-2. With respect to the motor vehicle 10 heading, the first axle 16-1 may be a leading axle and the second axle 16-2 may be a trailing axle. As shown, the first axle 16-1 includes a first set of road wheels 18-1, while the second axle 16-2 includes a second set of road wheels 18-2 (such as individual left- and right-side wheels on each axle). Each of the road wheels 18-1, 18-2 employ tires configured to provide fictional contact with the road surface 12. Although two axles, the first and second axles 16-1, 16-2, are specifically shown, nothing precludes the motor vehicle 10 from having additional axles. The motor vehicle 10 also includes a steering actuator 20 configured to steer the first axle 16-1 via a steering angle (θ). The steering actuator 20 may be configured as an electrical power steering unit. The motor vehicle 10 additionally includes a drivetrain 22 including a power-source 22A configured to transmit a drive torque to the first axle 16-1 and/or the second axle 16-2.

As shown in FIG. 1, the motor vehicle 10 includes at least one sensor 24A and an electronic controller 26 that cooperate together to at least partially control, guide, and maneuver the vehicle 10 in an autonomous mode during certain situations. As such, the vehicle 10 may be referred to as a semi-autonomous or a fully autonomous vehicle. To enable efficient and reliable vehicle control, the electronic controller 26 may be in operative communication with the steering actuator 20 configured as an electrical power steering unit. The sensors 24A of the motor vehicle 10 are operable to sense the road surface 12 and monitor a surrounding geographical area and traffic conditions proximate the host vehicle.

The sensors 24A of the vehicle 10 may include, but are not limited to, at least one of a Light Detection and Ranging (LIDAR) sensor, radar, and camera located around the vehicle 10 to detect the boundary indicators, such as edge conditions, of the road surface 12. The type of sensors 24A, their location on the vehicle 10, and their operation for detecting and/or sensing the boundary indicators of the road surface 12 and monitor the surrounding geographical area and traffic conditions are understood by those skilled in the art, are not pertinent to the teachings of this disclosure, and are therefore not described in detail herein. The vehicle 10 may additionally include sensors 24B attached to the vehicle drivetrain 22, such as a yaw rate sensor, an accelerometer, wheel speed sensors, a longitudinal velocity sensor, and a lateral velocity sensor.

The electronic controller 26 is disposed in communication with the sensors 24A of the vehicle 10 for receiving their respective sensed data related to the detection or sensing of the road surface 12 and monitoring of the surrounding geographical area and traffic conditions. The electronic controller 26 may alternatively be referred to as a control module, a control unit, a controller, a vehicle 10 controller, a computer, etc. The electronic controller 26 may include a computer and/or processor 28, and include software, hardware, memory, algorithms, connections (such as to sensors 24A and 24B), etc., for managing and controlling the operation of the vehicle 10. As such, a method, described below and generally represented in FIG. 4, may be embodied as a program or algorithm operable on the electronic controller 26. It should be appreciated that the electronic controller 26 may include a device capable of analyzing data from the sensors 24A and 24B, comparing data, making the decisions required to control the operation of the vehicle 10, and executing the required tasks to control the operation of the vehicle 10.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

The electronic controller 26 includes a tangible, non-transitory memory 30 on which are recorded computer-executable instructions, including one or more algorithms, for regulating operation of the motor vehicle 10. The subject algorithm(s) may specifically include a Model Predictive control (MPC) algorithm 32 for maintaining stability of the motor vehicle 10 to be described in detail below. The processor 28 of the electronic controller 26 is configured to execute the algorithm 32. The algorithm 32 implements a method of maintaining stability of the vehicle 10 when the vehicle is negotiating the road surface 12 along a desired or selected path, including various bends and curves. Specifically, instability of the motor vehicle 10, especially while negotiating a turn, may be defined as an oversteer condition resulting in a vehicle skid and possibly a spin.

The motor vehicle 10 also includes a vehicle navigation system 34, which may be part of integrated vehicle controls or an add-on apparatus used to find travel direction in the vehicle. The vehicle navigation system 34 may be operatively connected to a global positioning satellite (GPS) 36. The vehicle navigation system 34 in connection with the GPS 36 and the above-mentioned sensors 24A may be used for automation of the vehicle 10. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be calculated. On-the-fly traffic information may be used to adjust the route. Current position of a vehicle 10 may be calculated via dead reckoning—by using a previously determined position and advancing that position based upon known or estimated speeds over elapsed time and course. Data from sensors 24B attached to the vehicle's drivetrain 22, e.g., yaw rate sensor, accelerometer, and velocity sensors, and vehicle mounted radar and optical equipment may be used for greater reliability and to counter GPS 36 signal loss and/or multipath interference due to urban canyons or tunnels.

The electronic controller 26 is additionally configured, i.e., programmed, to determine localization 38 (current position in the X-Y plane, shown in FIG. 1), a desired or intended path 40, and heading 42 of the motor vehicle 10 on the road surface 12 via the navigation system 34 receiving data from the GPS 36. The desired path 40 may include discrete waypoints, such as points A, B, and C shown in FIG. 1. As noted above, the motor vehicle 10 may be configured to operate in an autonomous mode guided by the electronic controller 26. In such a mode, the electronic controller 26 may further obtain data from vehicle sensors 24B to guide the vehicle along the desired path 40, such as via regulating the steering actuator 20. The electronic controller 26 may be additionally programmed to detect and monitor the steering angle ($\theta$) of the steering actuator 20 along the desired path 40, such as during a negotiated turn. Specifically, the electronic controller 26 may be programmed to determine the steering angle ($\theta$) via receiving and processing data signals from a steering position sensor 44 (shown in FIG. 1) in communication with the steering actuator 20.

Figure 2:
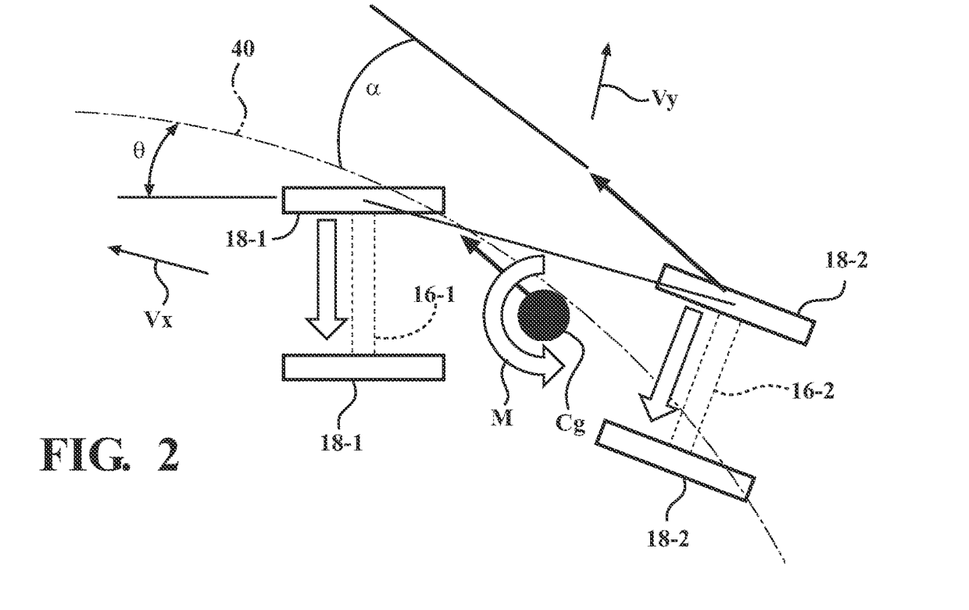
FIG. 2 is a schematic partial plan view of the vehicle experiencing a loss of stability as indicated by a side-slip angle of the second axle relative to the selected path shown in FIG. 1, according to the present disclosure.

The electronic controller 26 is also configured to determine a current side-slip angle ($\alpha$) of the second axle 16-2, such as by detecting data indicative of a dynamic state of the motor vehicle 10 (shown in FIG. 2). The side-slip angle ($\alpha$) of the second axle 16-2 defines how much the road wheels 18-2 have slipped in a direction generally perpendicular to the desired path 40. Specifically, the electronic controller 26 may be programmed to determine the current side-slip angle ($\alpha$) of the second axle 16-2, which may occur as the vehicle 10 is negotiating a turn on the desired path 40. Determination of the current side-slip angle ($\alpha$) of the second axle 16-2 may be accomplished using data indicative of the dynamic state of the motor vehicle 10 received from appropriate sensors 24B attached to the vehicle's drivetrain 22. For example, the subject data may be collected and communicated to the electronic controller 26 via appropriate sensors 24B, for example, a yaw rate sensor may be used to detect the yaw rate $\psi'$, while wheel speed sensors and/or accelerometer(s) may be used to detect longitudinal velocity $V_x$ and lateral velocity $V_y$. The GPS 36 may likewise be used to detect or assist with detecting the longitudinal velocity $V_x$ and lateral velocity $V_y$. Additionally, roll rate and pitch rate sensors may be included among the sensors 24B to assist with assessment of the side-slip angle ($\alpha$) of the second axle 16-2.

The electronic controller 26 is additionally configured to set or establish a maximum permitted side-slip angle ($\alpha_{max}$) of the second axle 16-2 using a friction coefficient ($\mu$) value at the interface between the motor vehicle 10, i.e., the wheels 18-1, 18-2, and the road surface 12. Specifically, the electronic controller 26 may be programmed to determine the maximum side-slip angle ($\alpha_{max}$) according to the following relationship:

$$\alpha_{max} = \mu * \alpha \qquad (46)$$

In the subject relationship 46, $\mu$ is the friction coefficient at the interface between the motor vehicle 10 and the road surface 12. The value of side-slip angle ($\alpha$) is generally tied to specific tire characteristics of the subject vehicle and represents the point a side force on an axle saturates and the corresponding tire begins to slide. For example, the value of $\alpha$ on a dry road surface before the vehicle begins to slide is typically around 8 degrees. If $\mu < 0.3$, such as on a wet road surface, the maximum side-slip angle ($\alpha_{max}$) may be set in a range of 1-2 degrees. Alternatively, if $\mu > 0.3$, such as on a dry road surface, the maximum side-slip angle ($\alpha_{max}$) may be set in a range of 3-4 degrees. In the event $\mu$ is unknown, the maximum side-slip angle ($\alpha_{max}$) may be set to 1 degree.

The electronic controller 26 is also configured to predict when the maximum side-slip angle ($\alpha_{max}$) of the second axle 16-2 is to be, or would be, exceeded using the vehicle 10 localization 38 and heading 42 and the determined current side-slip angle ($\alpha$) of the second axle as inputs to a linear computational model 48 embedded in the algorithm 32. The electronic controller 26 is also configured to update the linear computational model 48 using the prediction of when the maximum side-slip angle ($\alpha_{max}$) of the second axle 16-2 is to be exceeded to determine impending instability of the motor vehicle 10. The electronic controller 26 is further configured to correct for the impending instability using the updated linear computational model 48 and the maximum side-slip angle ($\alpha_{max}$) of the second axle 16-2 via commanding the steering actuator 20 to modify steering angle ($\theta$).

With reference to FIG. 2, as the vehicle loses road grip or traction at the second axle 16-2, for example, due to an unexpected encounter with a low friction area (such as a puddle or a patch of gravel or ice), the force on the second axle 16-2 decreases rapidly, while the force on first axle 16-1 increases. As a result, a rotating moment M will develop on the vehicle body 14 around the vehicle's center of gravity $C_g$, such that the vehicle 10 will have a tendency to spin. Commanding the steering actuator 20 to modify steering angle ($\theta$) is intended to reduce the force on the first axle 16-1 while increasing the force on the second axle 16-2, thereby stabilizing the vehicle 10. The electronic controller 26 may be specifically configured to determine a target steering angle (OT) of the steering actuator 20 and compare the target steering angle to the detected steering angle ($\theta$). In the event the target steering angle (OT) is, for example, greater than the detected steering angle ($\theta$), the electronic controller 26 may command the steering actuator 20 to reduce the steering angle ($\theta$) to the target steering angle (OT). The subject reduction of the steering angle ($\theta$) would thereby limit the side-slip angle (α) of the second axle 16-2 and preempt impending instability of the vehicle 10 on the desired path 40, such as while negotiating a turn.

With resumed reference to FIG. 1, the linear computational model 48 may be part of the above-noted Model Predictive control (MPC) algorithm 32. As part of the MPC algorithm 32, the linear computational model 48 may be configured to determine the impending instability of the motor vehicle 10 by repeatedly solving a model-based open-loop finite-horizon optimal control equation employing constraints on the steering actuator 20. The subject constraints on the steering actuator 20 may include steering rate and angle limits, which may be variable in relation to longitudinal velocity $V_x$ and lateral velocity $V_y$ of the vehicle 10, and the maximum side-slip angle ($α_{max}$) of the second axle 16-2. Specifically, the MPC algorithm 32 may be used to find an optimum control sequence over a future horizon in a limited number of steps. At each sample time, the vehicle state may be estimated to minimize a performance index subjected to the prediction model and the constraints on the steering actuator 20. Quadratic programming (QP) may then be used to solve a resultant mathematical optimization problem involving a multivariate quadratic function subject to linear constraints, input constraints on the steering actuator 20. The side-slip angle (α) of the second axle 16-2 is defined as an output constraint of the optimization problem, i.e., the maximum side-slip angle ($α_{max}$) to avoid instability of the vehicle 10.

Figure 3:
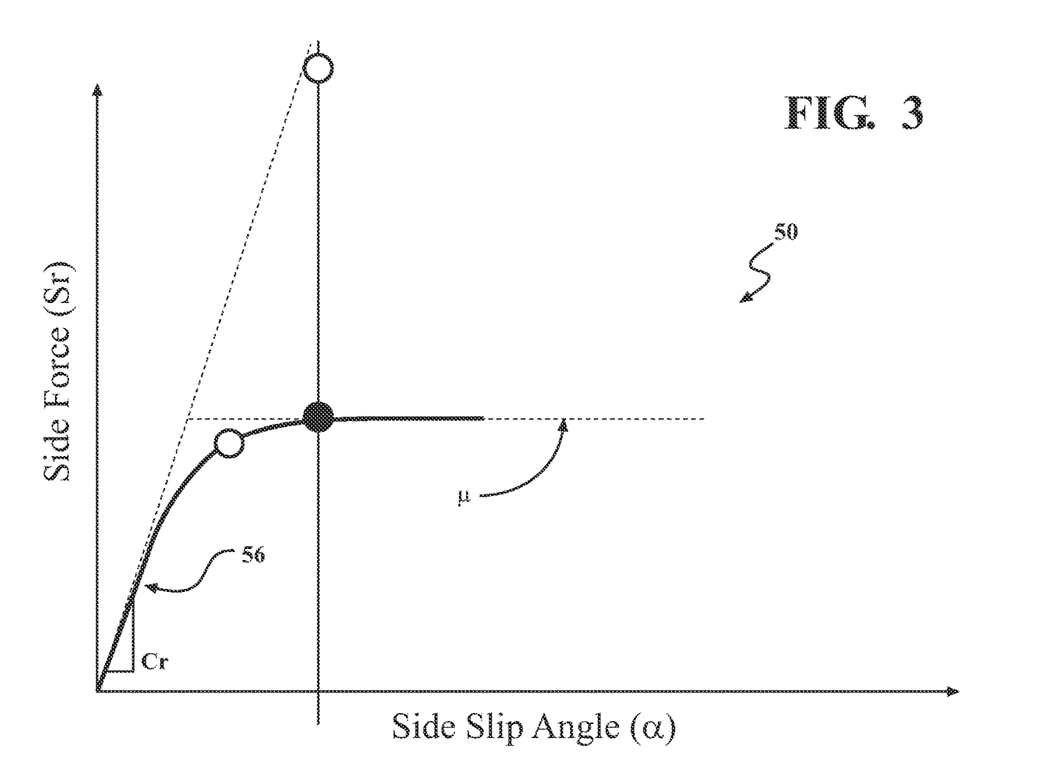
FIG. 3 is plot of a side force on the second axle as a function of the side-slip angle of the second axle shown in FIGS. 1 and 2, according to the present disclosure.

The linear computational model 48 may employ data of a side force (Sr) on the second axle 16-2 as a function of the side-slip angle (α) of the second axle shown on a plot 50 in FIG. 3 to predict when the maximum side-slip angle ($α_{max}$) of the second axle would be exceeded. Specifically, the side-slip angle (α) of the second axle 16-2 may be expressed as follows:

$$α = (-V_y + lr*\psi')/V_x \quad (52)$$

In the expression 52, lr (shown in FIG. 1) is a distance from the vehicle's center of gravity $C_g$ to the second axle 16-2. Furthermore, the side force (Sr) on the second axle 16-2 may be expressed as follows:

$$Sr = f(a) = +/- Cr*α \quad (54)$$

In the expression 54, Cr is a vehicle cornering stiffness depicted as a slope of the linear region 56 in the FIG. 3. Generally, the side slip angle of a vehicle axle is a linear combination of the vehicle's lateral velocity and yaw rate. However, as shown in FIG. 3, the side force (Sr) is a nonlinear function that depends on the side-slip angle (α) and the road conditions, i.e., the friction coefficient μ. Generally, vehicle instability occurs when the side force (Sr) exceeds the friction coefficient (μ) at the interface between the motor vehicle 10 and the road surface 12.

Because of the subject non-linearity of the side force (Sr), a simple MPC linear prediction model is incapable of calculating output limits. To permit the linear computational model 48 to effectively calculate output limits, the MPC algorithm 32 is first adapted to effectively predict a vehicle spin—when the maximum side-slip angle ($α_{max}$) of the second axle 16-2 is to be exceeded to determine impending instability of the motor vehicle 10. Then, the linear computational model 48 is updated to use the prediction of when the maximum side-slip angle ($α_{max}$) of the second axle 16-2 is to be exceeded to determine impending instability of the motor vehicle 10. In other words, the updated linear computational model 48 is used to predictively limit the impending instability by using output constraints, i.e., the maximum side-slip angle ($α_{max}$) of the second axle 16-2. Specifically, in the prediction, following calculation of the side force (Sr) via the expression 54, the vehicle cornering stiffness (Cr) is set to zero allowing the MPC model to describe a spinning vehicle. Then, the MPC model uses a maximum value for the side force (Sr) as input to limit the rate of vehicle spin to a controllable rate.

The electronic controller 26 is further configured to correct for the impending instability using the updated linear computational model 48 and the maximum side-slip angle ($α_{max}$) of the second axle 16-2 via commanding the steering actuator 20 to modify, e.g., reduce, the steering angle (θ). The modified steering angle (θ) is intended to correct for the impending instability of the motor vehicle 10, i.e., to counter and/or limit a possible vehicle spin, as the vehicle negotiates the desired path 40 between the waypoints A, B, C. For example, the electronic controller 26 may command the steering actuator 20 to steer the first axle 16-1 at a target steering angle (OT), if the detected side-slip angle (α) of the second axle is greater than the maximum side-slip angle ($α_{max}$) of the second axle 16-2, to thereby counter and limit instability of the motor vehicle 10 during the turn. The electronic controller 26 may thus be also programmed to compare the target steering angle (OT) to the detected steering angle (θ) of the steering actuator 20 and determine a required incremental steering angle change (AO) to maintain stability and equilibrium of the motor vehicle 10. As such, predictively limiting the impending instability of the motor vehicle 10 via controlling the steering angle (θ) may be employed to maintain the vehicle on its intended path 40.

Figure 4:
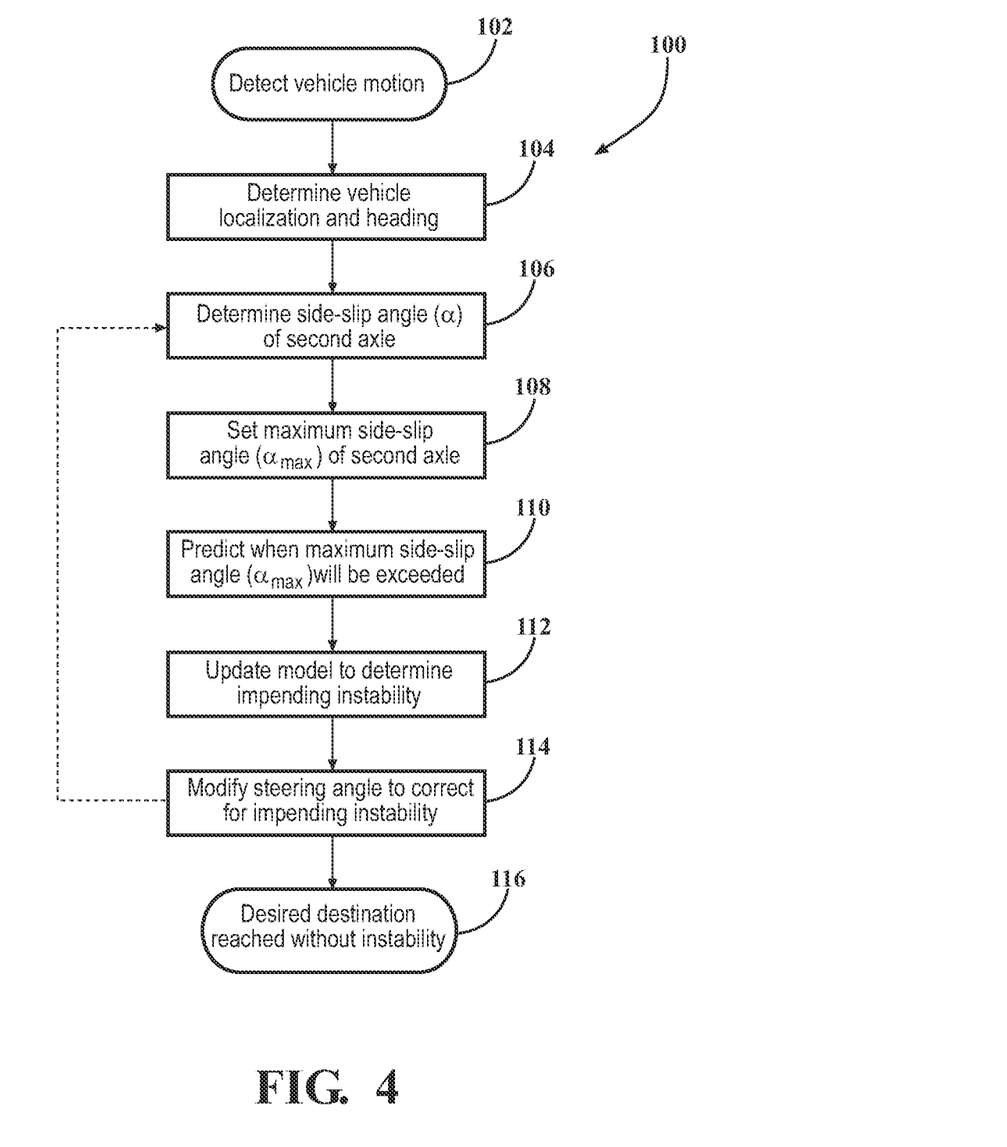
FIG. 4 is a flow diagram of a method of maintaining stability of the motor vehicle shown in FIGS. 1-2 and according to the plot of the side force vs. the side-slip angle of the second axle shown in FIG. 3.

A method 100 of maintaining stability of a motor vehicle, such as the vehicle 10 described with respect to FIGS. 1-3, is depicted in FIG. 4 and disclosed in detail below. Method 100 commences in frame 102 with detecting, via the electronic controller 26, the vehicle 10 being in motion. The electronic controller 26 may detect motion of the vehicle 10 via the GPS 36 and/or vehicle sensors 24A, 24B. In frame 102, the method may additionally include detecting the steering angle (θ) of the steering actuator 20 via the steering position sensor 44. As noted above, the motor vehicle 10 may be configured to operate in an autonomous or a semi-autonomous mode guided by the electronic controller 26. After frame 102, the method advances to frame 104.

In frame 104, the method includes determining, via the electronic controller 26, localization 38 and heading 42 of the motor vehicle 10 relative to the road surface 12. Determination of localization 38 and heading 42 of the motor vehicle 10 may include determining the desired path 40 and discrete waypoints, such as points A, B, and C, via the navigation system 34 using data from the GPS 36, and vehicle sensors 24A. After frame 104, the method advances to frame 106. In frame 106 the method includes determining the current side-slip angle (α) of the second axle 16-2, such as during a turn along the desired path 40. Determination of the current side-slip angle (α) of the second axle 16-2 may include receiving, via the electronic controller 26, data indicative of the dynamic state of the motor vehicle 10 from the sensors 24B, including a yaw rate sensor to detect the vehicle yaw rate ($\psi'$), wheel speed sensors, the GPS 36, and accelerometer(s) to detect longitudinal velocity ($V_x$) and lateral velocity ($V_y$) of the vehicle. From frame 106 the method advances to frame 108.

In frame 108 the method includes setting, via the electronic controller 26, the maximum side-slip angle ($α_{max}$) of the second axle 16-2 using the friction coefficient (0 value at the interface between the vehicle's second set of road wheels 18-2 and the road surface 12. As described with respect to FIGS. 1-3, the maximum side-slip angle ($\alpha_{max}$) may be determined according to relationship $\alpha_{max}=\mu*8$ degrees. Additionally, if $\mu<0.3$, the maximum side-slip angle ($\alpha_{max}$) may be set in the range of 1-2 degrees, while if $\mu>0.3$, the maximum side-slip angle ($\alpha_{max}$) may be set in the range of 3-4 degrees. Alternatively, if $\mu$ is unknown, the maximum side-slip angle ($\alpha_{max}$) may be set to 1 degree. After frame 108, the method proceeds to frame 110.

In frame 110, the method includes predicting, via the electronic controller 26, when the maximum side-slip angle ($\alpha_{max}$) of the second axle 16-2 is to be exceeded using the localization 38 and heading 42 of the motor vehicle 10 and the determined current side-slip angle ($\alpha$) of the second axle 16-2 as inputs to the linear computational model 48. As described above with respect to FIGS. 1-3, the linear computational model 48 may be embedded in the MPC algorithm 32 configured to determine the impending instability of the motor vehicle 10. Specifically, the MPC algorithm 32 is configured to repeatedly solve the open-loop finite-horizon optimal control equation employing constraints on the steering actuator 20 and the maximum side-slip angle ($\alpha_{max}$) of the second axle 16-2. After frame 110, the method advances to frame 112.

In frame 112, the method includes updating, via the electronic controller 26, the linear computational model 48 using the prediction of when the maximum side-slip angle ($\alpha_{max}$) of the second axle 16-2 will be exceeded to determine impending instability of the vehicle 10. From frame 112, the method advances to frame 114, where the method includes correcting, via the electronic controller 26, for the impending instability using the updated linear computational model 48 and the maximum side-slip angle ($\alpha_{max}$) of the second axle 16-2 via commanding the steering actuator 20 to modify the steering angle ($\theta$). The method may loop back from frame 114 to frame 106 for further determination of the current side-slip angle ($\alpha$) of the second axle 16-2 along the desired path 40. Alternatively, the method may conclude in frame 116 with the motor vehicle 10 reaching its desired destination without losing stability.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of maintaining stability of a motor vehicle having a first axle, a second axle, and a steering actuator configured to steer the first axle via a steering angle ($\theta$), the method comprising:
   determining, via an electronic controller, localization and heading of the motor vehicle relative to a road surface;
   determining a current side-slip angle ($\alpha$) of the second axle;
   setting, via the electronic controller, a maximum side-slip angle ($\alpha_{max}$) of the second axle using a friction coefficient ($\mu$) value at an interface between the motor vehicle and the road surface;
   predicting, via the electronic controller, when the maximum side-slip angle ($\alpha_{max}$) of the second axle is to be exceeded using the localization and heading of the motor vehicle and the determined current side-slip angle ($\alpha$) of the second axle as inputs to a linear computational model;
   updating, via the electronic controller, the linear computational model using the prediction of when the maximum side-slip angle ($\alpha_{max}$) of the second axle is to be exceeded to determine impending instability of the motor vehicle; and
   correcting, via the electronic controller, for the impending instability using the updated linear computational model and the maximum side-slip angle ($\alpha_{max}$) of the second axle via commanding the steering actuator to modify the steering angle ($\theta$).

2. The method according to claim 1, wherein:
   the motor vehicle is configured to operate in an autonomous mode guided by the electronic controller; and
   determining the localization and the heading of the motor vehicle includes determining, via the electronic controller, a desired path and discrete waypoints for the motor vehicle via receiving data from a global positioning satellite (GPS).

3. The method according to claim 2, wherein, with respect to the vehicle heading, the first axle is a leading axle, the second axle is a trailing axle, and instability of the motor vehicle is an oversteer condition culminating in a spin.

4. The method according to claim 2, wherein determining the current side-slip angle ($\alpha$) of the second axle includes receiving, via the electronic controller, data indicative of a dynamic state of the motor vehicle from sensors mounted to the vehicle, including a yaw rate sensor to detect a yaw rate ($\psi'$) of the motor vehicle, and at least one of wheel sensors, the GPS, and accelerometer(s) to detect longitudinal velocity ($V_x$) and lateral velocity ($V_y$) of the motor vehicle.

5. The method according to claim 4, wherein the linear computational model is embedded in a Model Predictive control (MPC) algorithm configured to determine the impending instability of the motor vehicle by repeatedly solving an open-loop finite-horizon optimal control equation employing constraints on the steering actuator and the maximum side-slip angle ($\alpha_{max}$) of the second axle.

6. The method according to claim 1, further comprising detecting the steering angle ($\theta$) of the steering actuator via a steering position sensor.

7. The method according to claim 1, wherein the steering actuator is configured as an electrical power steering unit.

8. The method according to claim 1, wherein the maximum side-slip angle ($\alpha_{max}$) is determined according to relationship $\alpha_{max}=\mu*\alpha$, and wherein $\mu$ is the friction coefficient at the interface between the motor vehicle and the road surface.

9. The method according to claim 1, wherein:
   if $\mu<0.3$, the maximum side-slip angle ($\alpha_{max}$) is in a range of 1-2 degrees; and
   if $\mu>0.3$, the maximum side-slip angle ($\alpha_{max}$) is in a range of 3-4 degrees.

10. The method according to claim 1, wherein, if $\mu$ is unknown, the maximum side-slip angle ($\alpha_{max}$) is set to 1 degree.

11. A motor vehicle comprising:
a first axle;
a second axle;
a steering actuator configured to steer the first axle via a steering angle ($\theta$);
a drivetrain configured to transmit a drive torque to the first axle and/or the second axle; and
an electronic controller configured to regulate the steering actuator and programmed to:
determine localization and heading of the motor vehicle relative to a road surface;
determine a current side-slip angle ($\alpha$) of the second axle;
set a maximum side-slip angle ($\alpha_{max}$) of the second axle using a friction coefficient ($\mu$) value at an interface between the motor vehicle and the road surface;
predict when the maximum side-slip angle ($\alpha_{max}$) of the second axle is to be exceeded using the localization and heading of the motor vehicle and the determined current side-slip angle ($\alpha$) of the second axle as inputs to a linear computational model;
update the linear computational model using the prediction of when the maximum side-slip angle ($\alpha_{max}$) of the second axle is to be exceeded to determine impending instability of the motor vehicle; and
correct for the impending instability using the updated linear computational model and the maximum side-slip angle ($\alpha_{max}$) of the second axle via commanding the steering actuator to modify the steering angle ($\theta$).

12. The motor vehicle according to claim 11, wherein:
the motor vehicle is configured to operate in an autonomous mode guided by the electronic controller; and
the electronic controller is programmed to determine the localization and the heading of the motor vehicle by determining a desired path and discrete waypoints for the motor vehicle via receiving data from a global positioning satellite (GPS).

13. The motor vehicle according to claim 12, wherein, with respect to the vehicle heading, the first axle is a leading axle, the second axle is a trailing axle, and instability of the motor vehicle is an oversteer condition culminating in a spin.

14. The motor vehicle according to claim 12, wherein the electronic controller is programmed to determine the current side-slip angle ($\alpha$) of the second axle via receiving data indicative of a dynamic state of the motor vehicle from sensors mounted to the vehicle, including a yaw rate sensor to detect a yaw rate ($\psi'$) of the motor vehicle, and at least one of wheel sensors, the GPS, and accelerometer(s) to detect longitudinal velocity ($V_x$) and lateral velocity ($V_y$) of the motor vehicle.

15. The motor vehicle according to claim 14, wherein the linear computational model is embedded in a Model Predictive control (MPC) algorithm configured to determine the impending instability of the motor vehicle by repeatedly solving an open-loop finite-horizon optimal control equation employing constraints on the steering actuator and the maximum side-slip angle ($\alpha_{max}$) of the second axle.

16. The motor vehicle according to claim 11, wherein the electronic controller is programmed to detect the steering angle ($\theta$) of the steering actuator via a steering position sensor.

17. The motor vehicle according to claim 11, wherein the steering actuator is configured as an electrical power steering unit.

18. The motor vehicle according to claim 11, wherein the electronic controller is programmed to determine the maximum side-slip angle ($\alpha_{max}$) according to relationship $\alpha_{max}=\mu*\alpha$, and wherein $\mu$ is the friction coefficient at the interface between the motor vehicle and the road surface.

19. The motor vehicle according to claim 11, wherein:
if $\mu<0.3$, the maximum side-slip angle ($\alpha_{max}$) is in a range of 1-2 degrees; and
if $\mu>0.3$, the maximum side-slip angle ($\alpha_{max}$) is in a range of 3-4 degrees.

20. The motor vehicle according to claim 11, wherein, if $\mu$ is unknown, the maximum side-slip angle ($\alpha_{max}$) is set to 1 degree.

* * * * *